Nov. 26, 1940.  A. MARCHEV  2,222,984
DUPLICATING APPARATUS
Filed June 23, 1938  13 Sheets-Sheet 1

Inventor:
Alfred Marchev,
By:
Zabel, Carlson, Fitzbaugh & Wells
Attorneys.

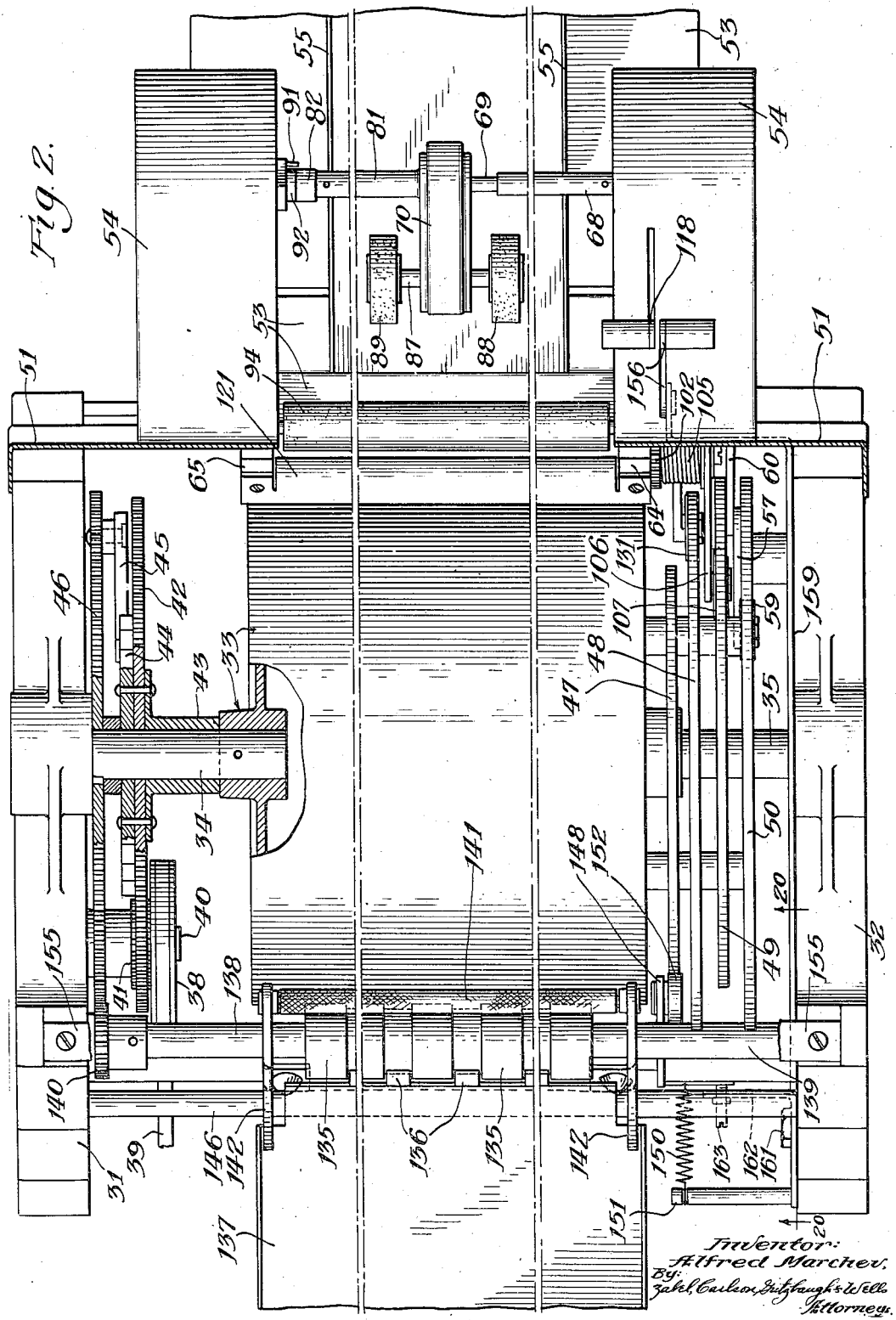

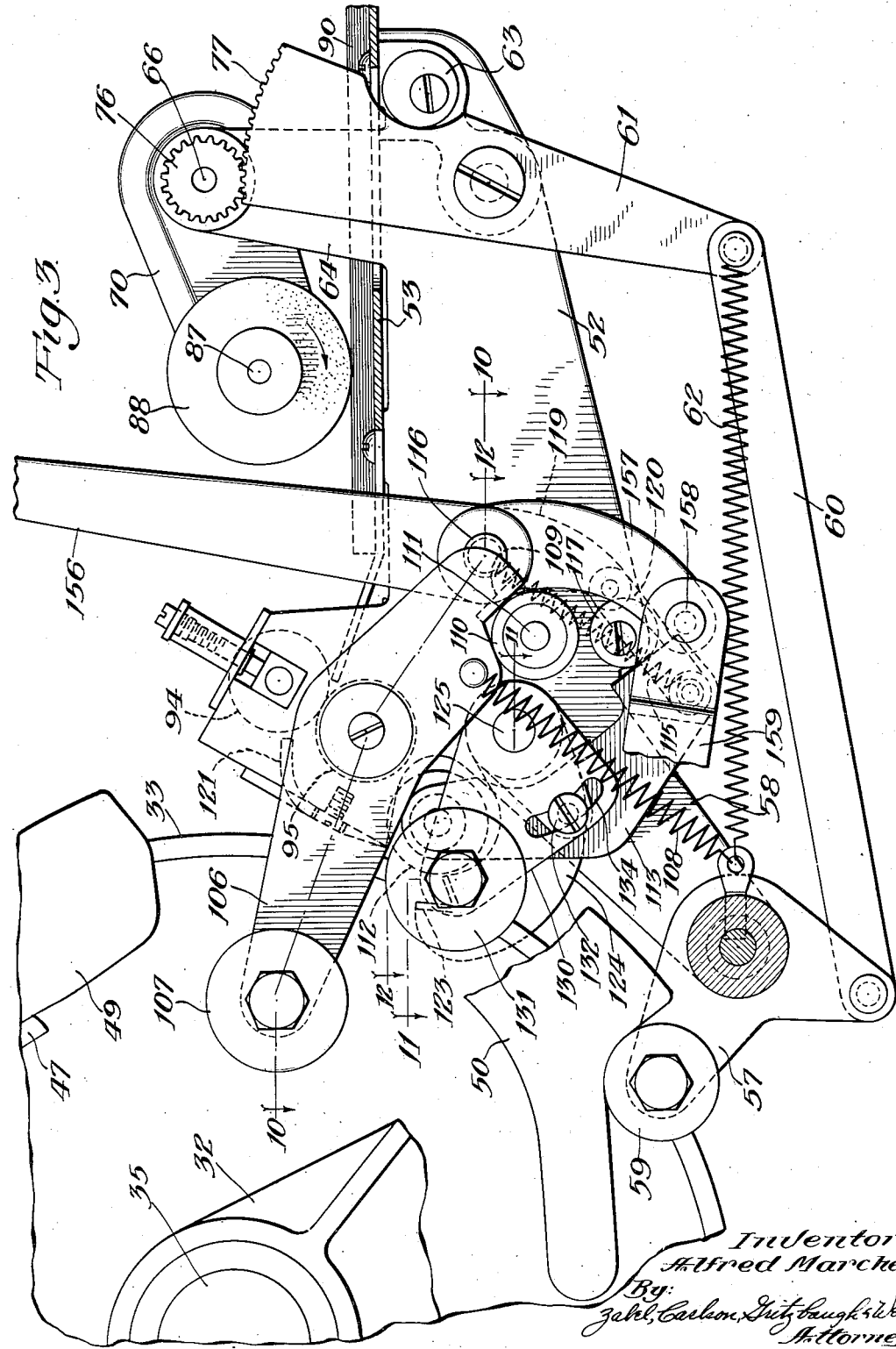

Nov. 26, 1940.  A. MARCHEV  2,222,984
DUPLICATING APPARATUS
Filed June 23, 1938  13 Sheets-Sheet 4
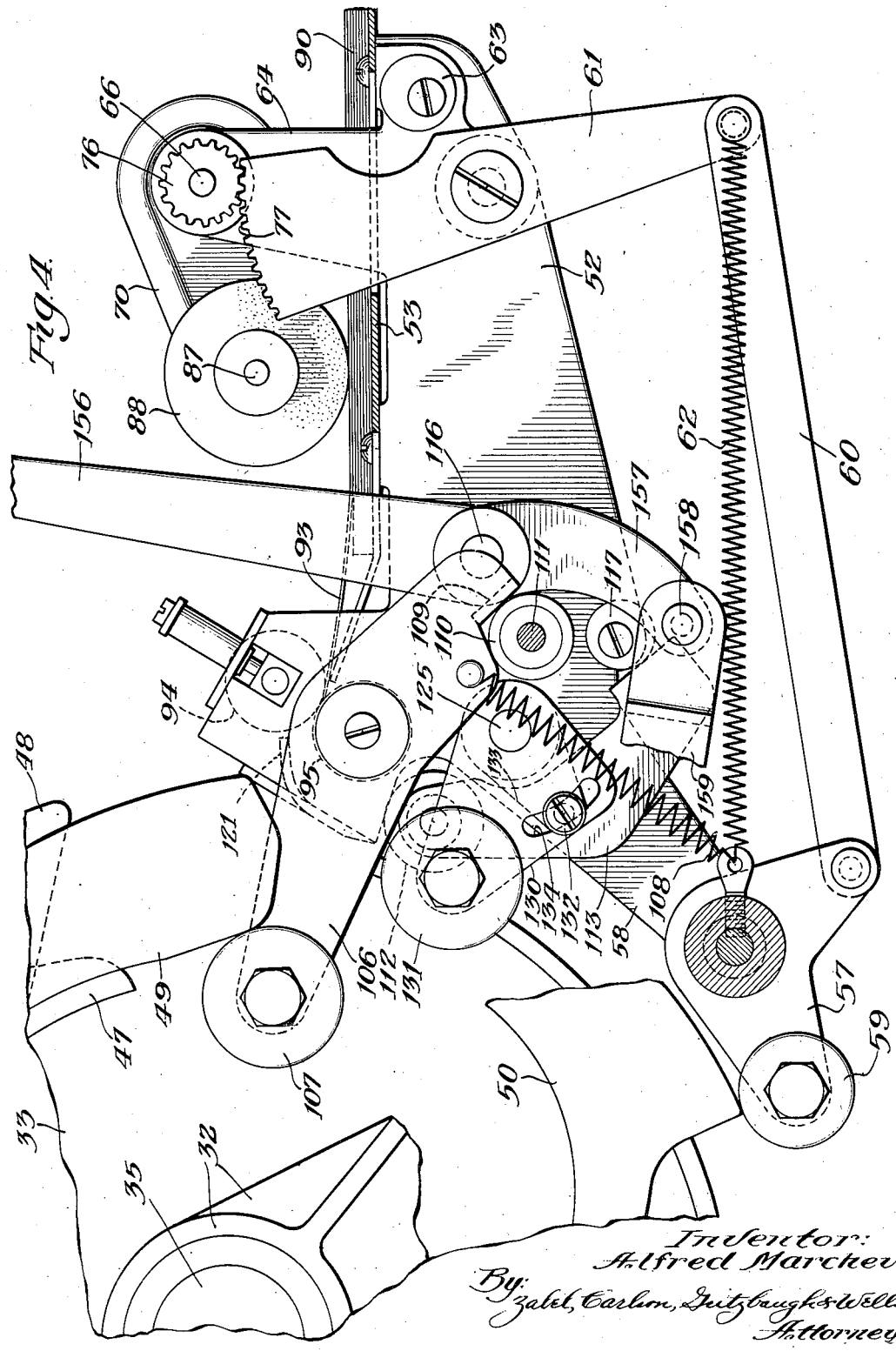

Nov. 26, 1940.   A. MARCHEV   2,222,984
DUPLICATING APPARATUS
Filed June 23, 1938   13 Sheets-Sheet 5
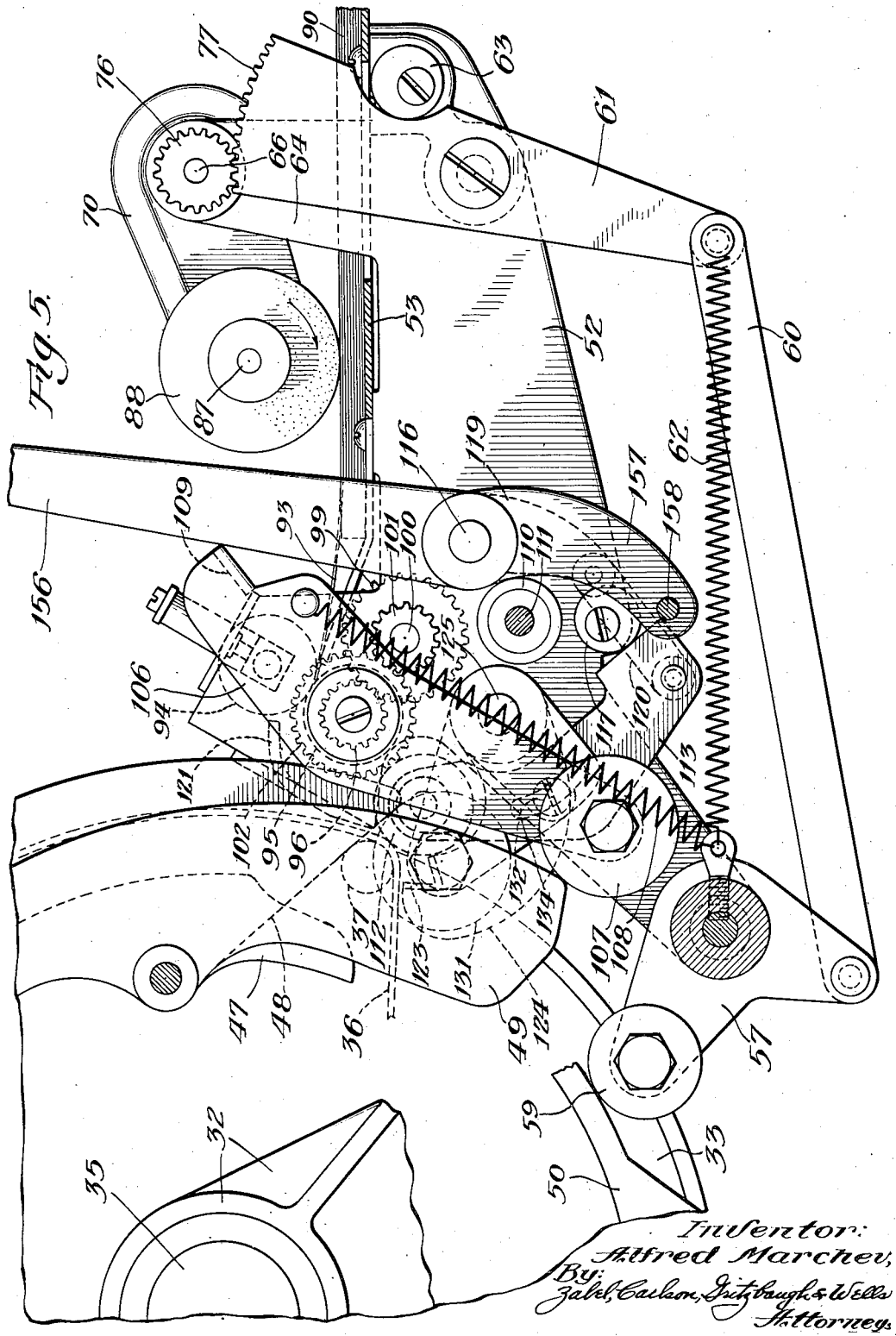

Nov. 26, 1940.   A. MARCHEV   2,222,984
DUPLICATING APPARATUS
Filed June 23, 1938   13 Sheets-Sheet 6
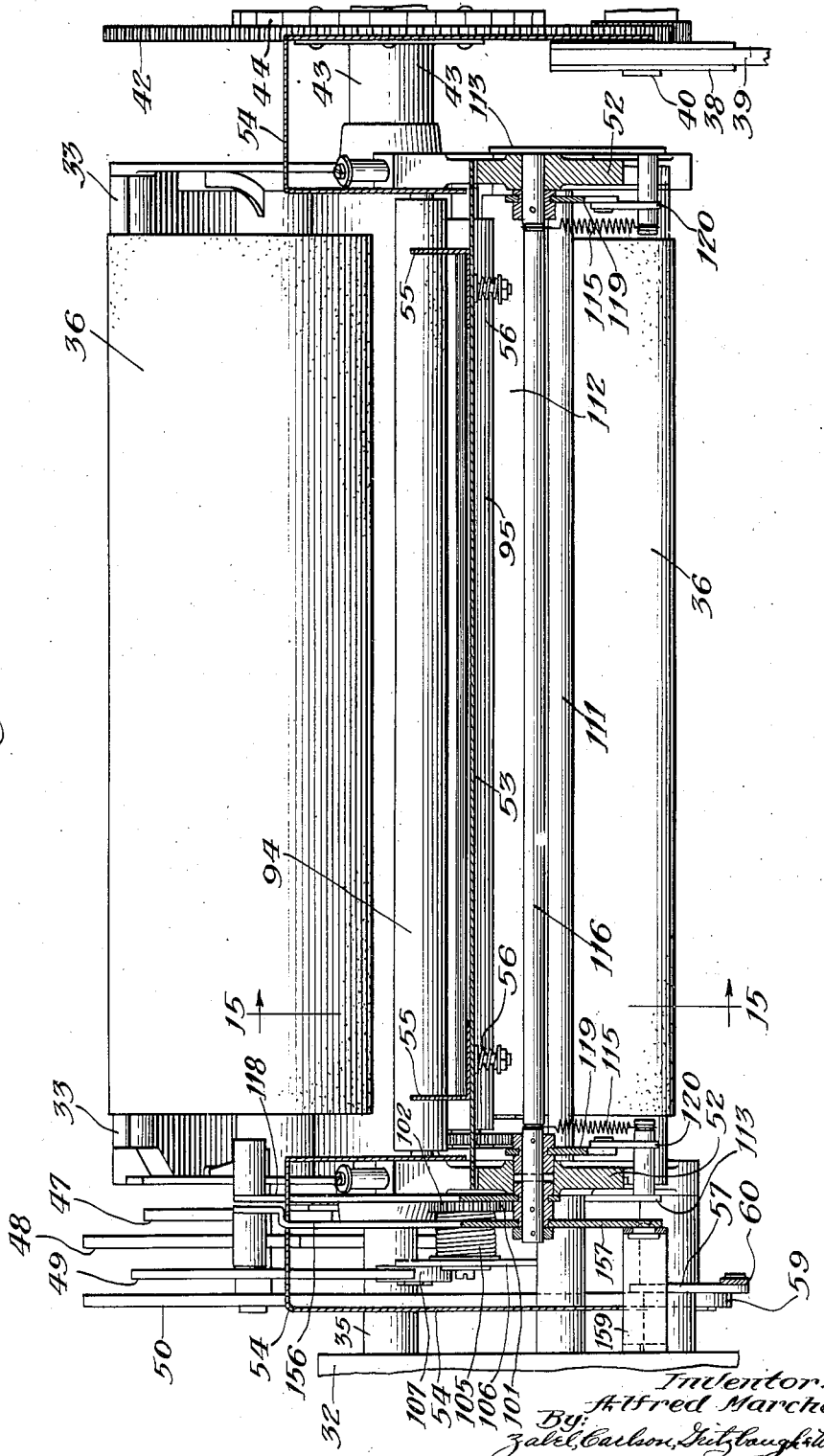

Nov. 26, 1940.  A. MARCHEV  2,222,984
DUPLICATING APPARATUS
Filed June 23, 1938  13 Sheets-Sheet 7
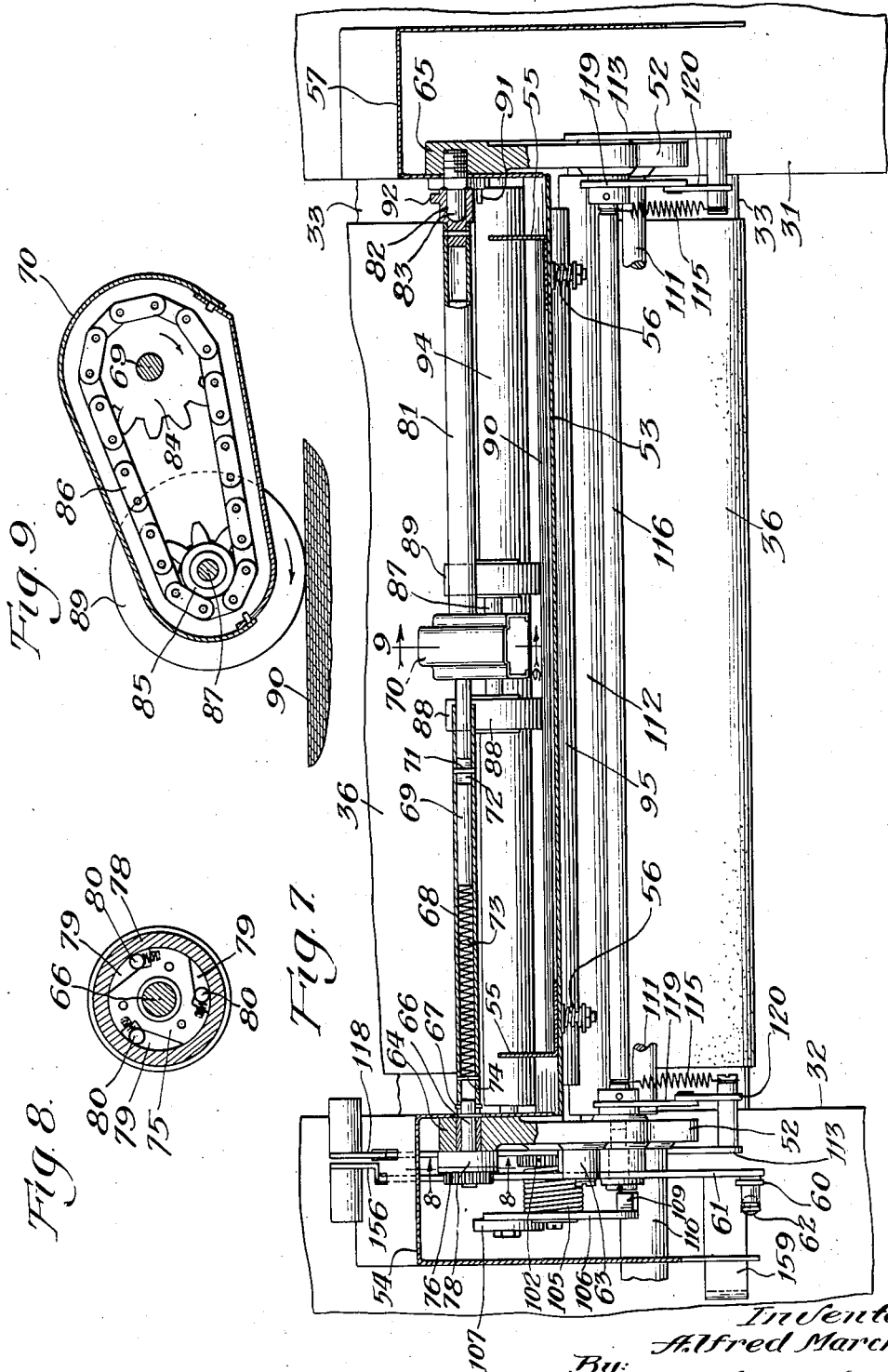

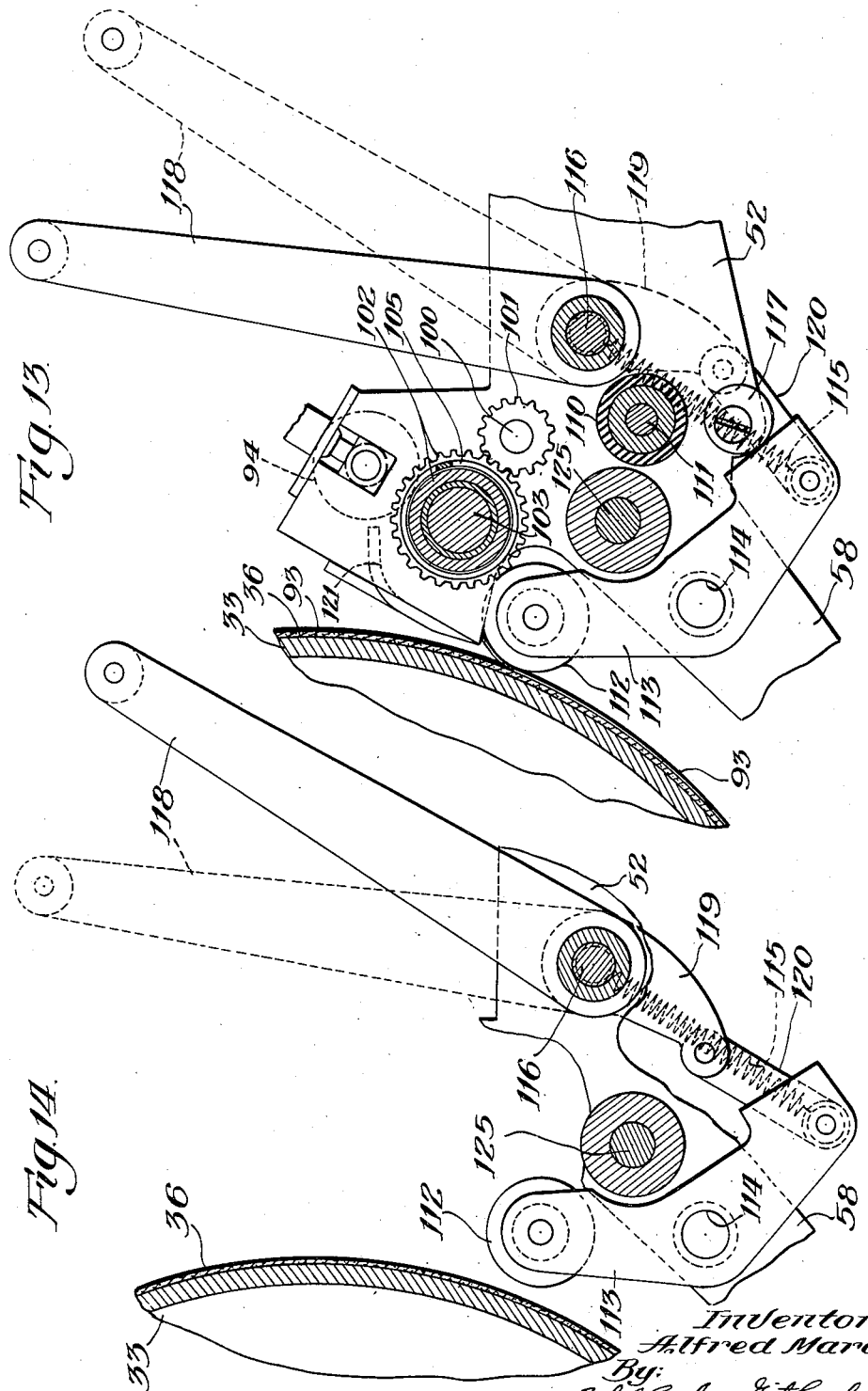

Nov. 26, 1940.  A. MARCHEV  2,222,984
DUPLICATING APPARATUS
Filed June 23, 1938  13 Sheets-Sheet 10
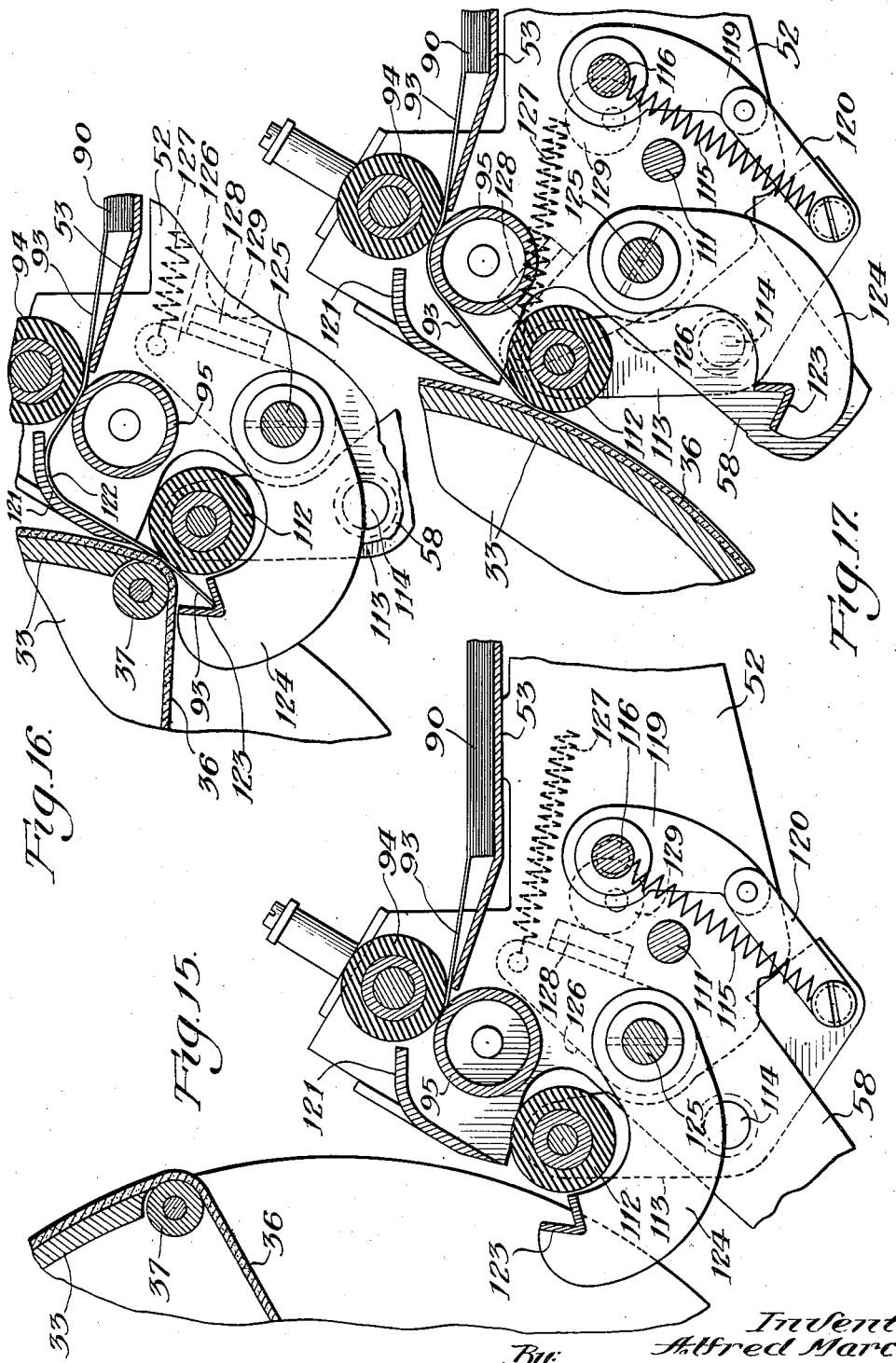
Inventor:
Alfred Marchev,
By Zabel, Carlson, Fitzbaugh & Wells
Attorneys Nov. 26, 1940.  A. MARCHEV  2,222,984
DUPLICATING APPARATUS
Filed June 23, 1938  13 Sheets-Sheet 11
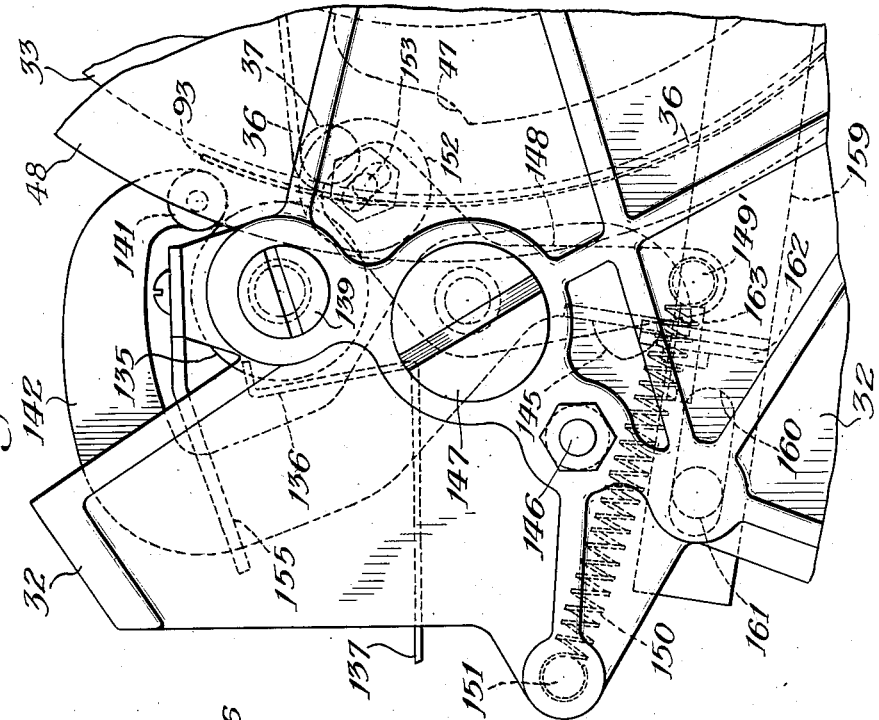
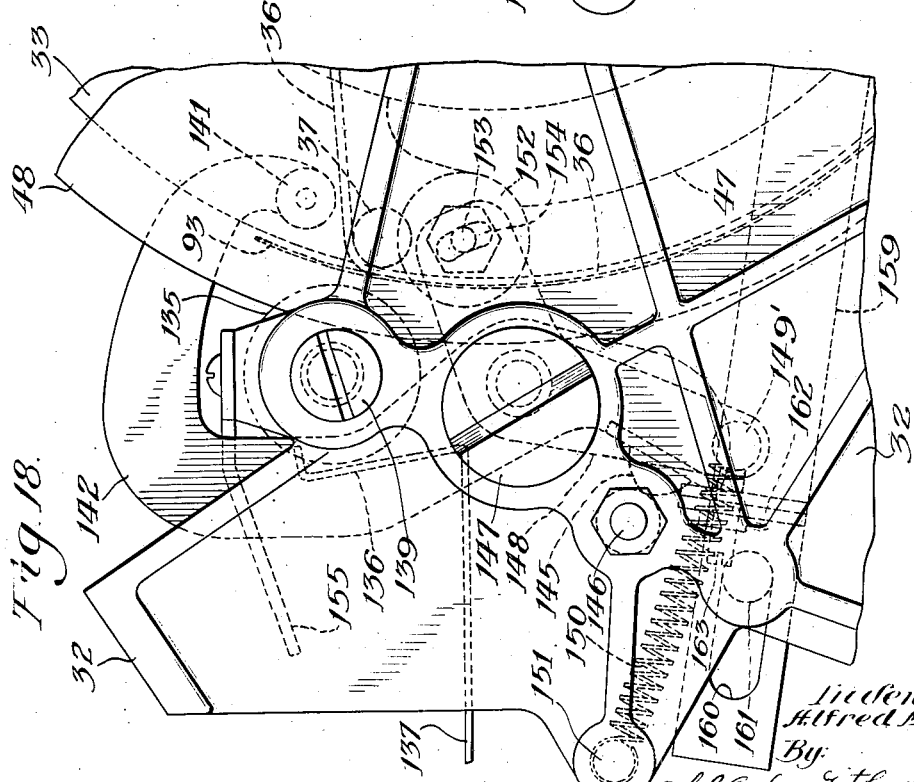

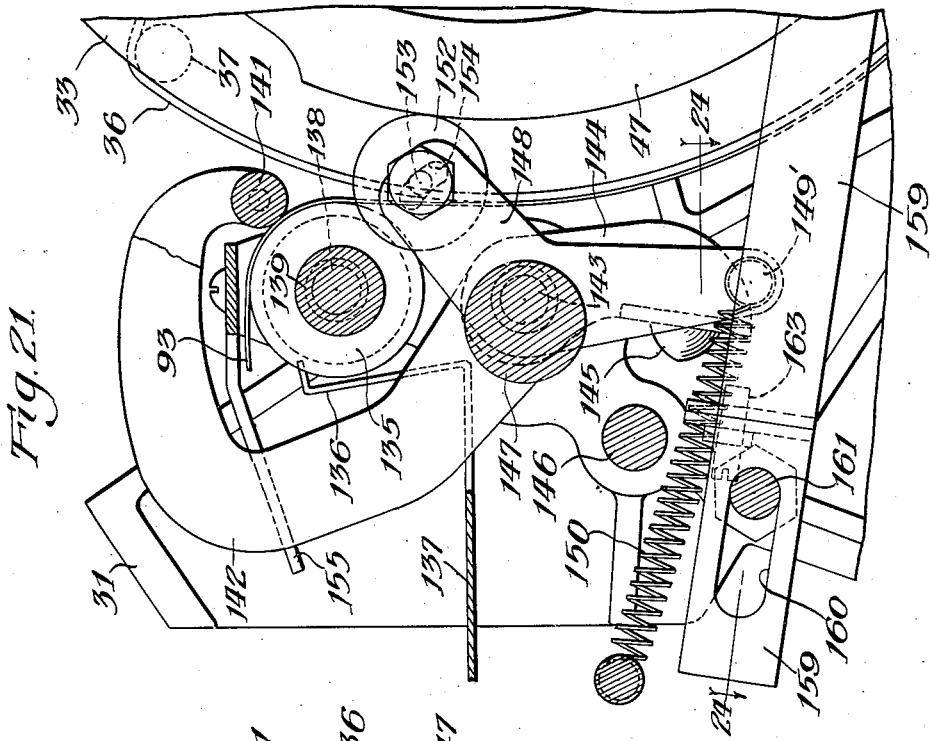
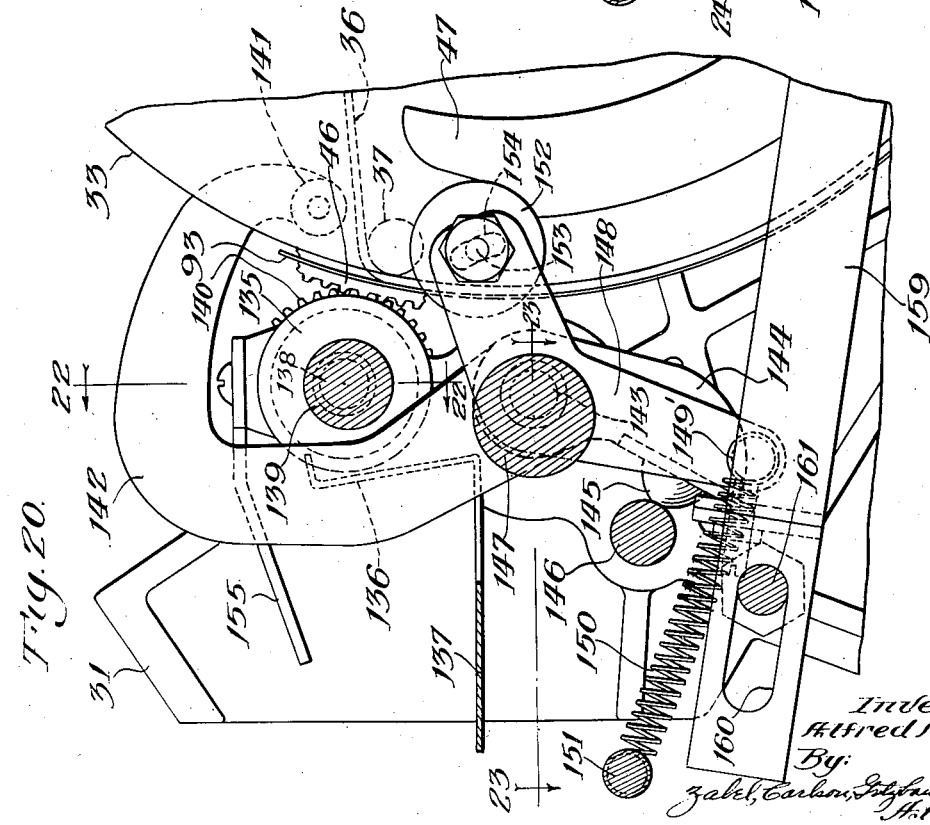

Nov. 26, 1940.　　　A. MARCHEV　　　2,222,984
DUPLICATING APPARATUS
Filed June 23, 1938　　13 Sheets-Sheet 13
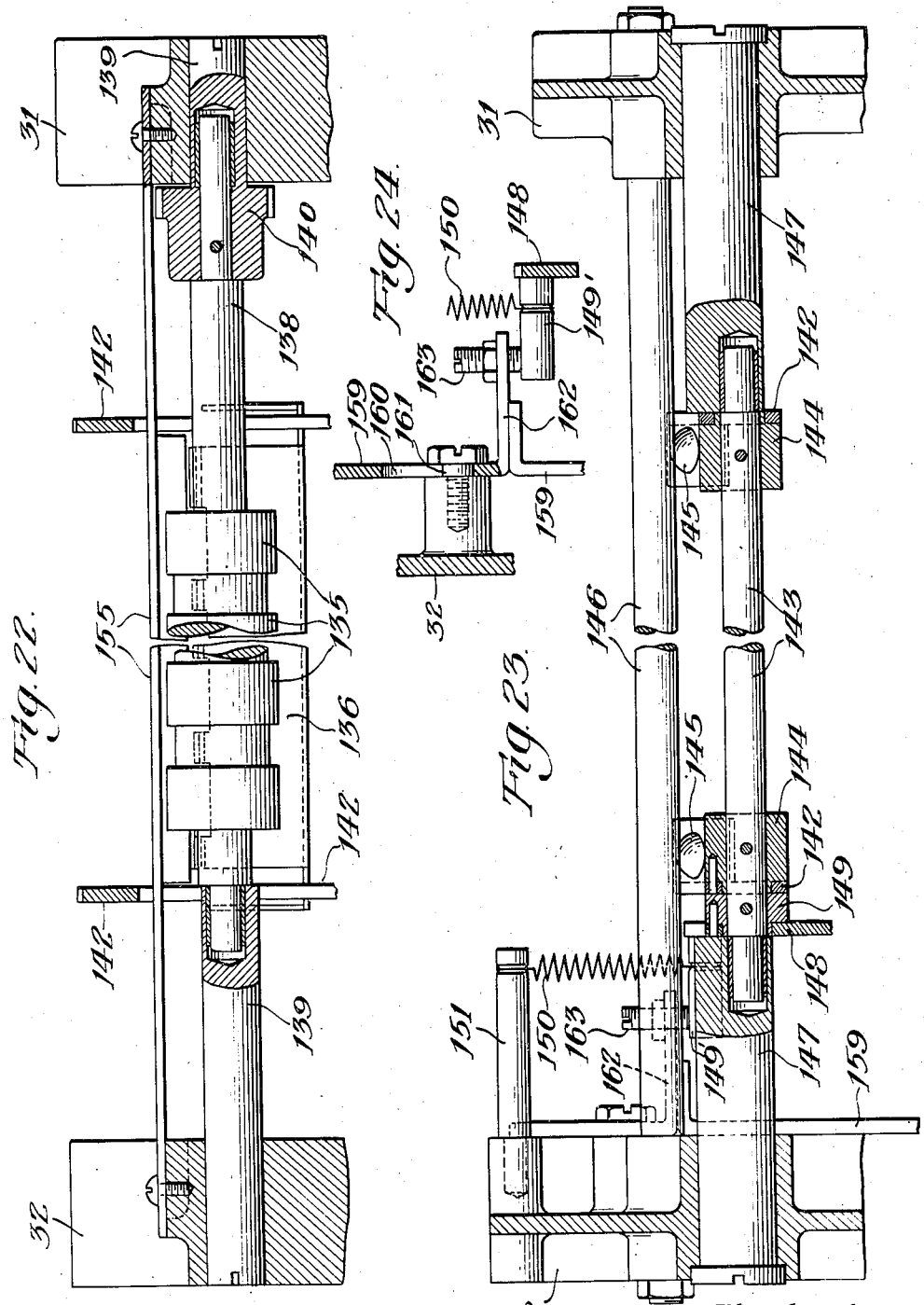
Inventor:
Alfred Marchev,
By Zabel, Carlson, Gritzbaugh & Wells
Attorneys.

Patented Nov. 26, 1940

2,222,984

UNITED STATES PATENT OFFICE 2,222,984

DUPLICATING APPARATUS

Alfred Marchev, La Grange, Ill., assignor to Ditto, Incorporated, Chicago, Ill., a corporation of West Virginia Application June 23, 1938, Serial No. 215,357

16 Claims. (Cl. 101—132)

This invention relates to duplicating apparatus of the type in which the reading matter or other design to be duplicated is carried in reverse on a gelatin band mounted about a drum to which copy sheets are fed one at a time and pressed by an impression roller or platen into operative face engagement with the band as the drum rotates for printing such copy sheets, and it is the object of the invention to provide an improved form and arrangement of parts by which improved results may be attained.

The invention is directed particularly to the means for feeding the sheets one at a time to the duplicating drum, to the means by which the copy sheet is brought into proper adjusted position with respect to the design on the gelatin band for providing the desired margins on the printed sheet, and to the means by which the printed sheets are stripped from the gelatin band. It has been among the objects of the invention to provide an improved arrangement by which the stripper mechanism can be thrown out of position so as to provide for a sheet to pass a plurality of times between the drum and the platen, and to provide improved means for supporting the platen in operative position and alternatively for moving the platen out of operative position with respect to the drum.

It is another object of this invention to improve apparatus of this type in sundry details hereinafter pointed out. The preferred means by which the several objects have been accomplished are illustrated in the accompanying drawings, in which—

Fig. 2 is a top plan view of the parts shown in Fig. 1, but with certain of the parts partially broken away so as to be shown in horizontal section.

Fig. 3 is an enlarged detailed view of certain of the parts as shown in Fig. 1.

Figs. 4 and 5 are views similar to Fig. 3 but showing changed positions of some of the parts.

Figure 1:
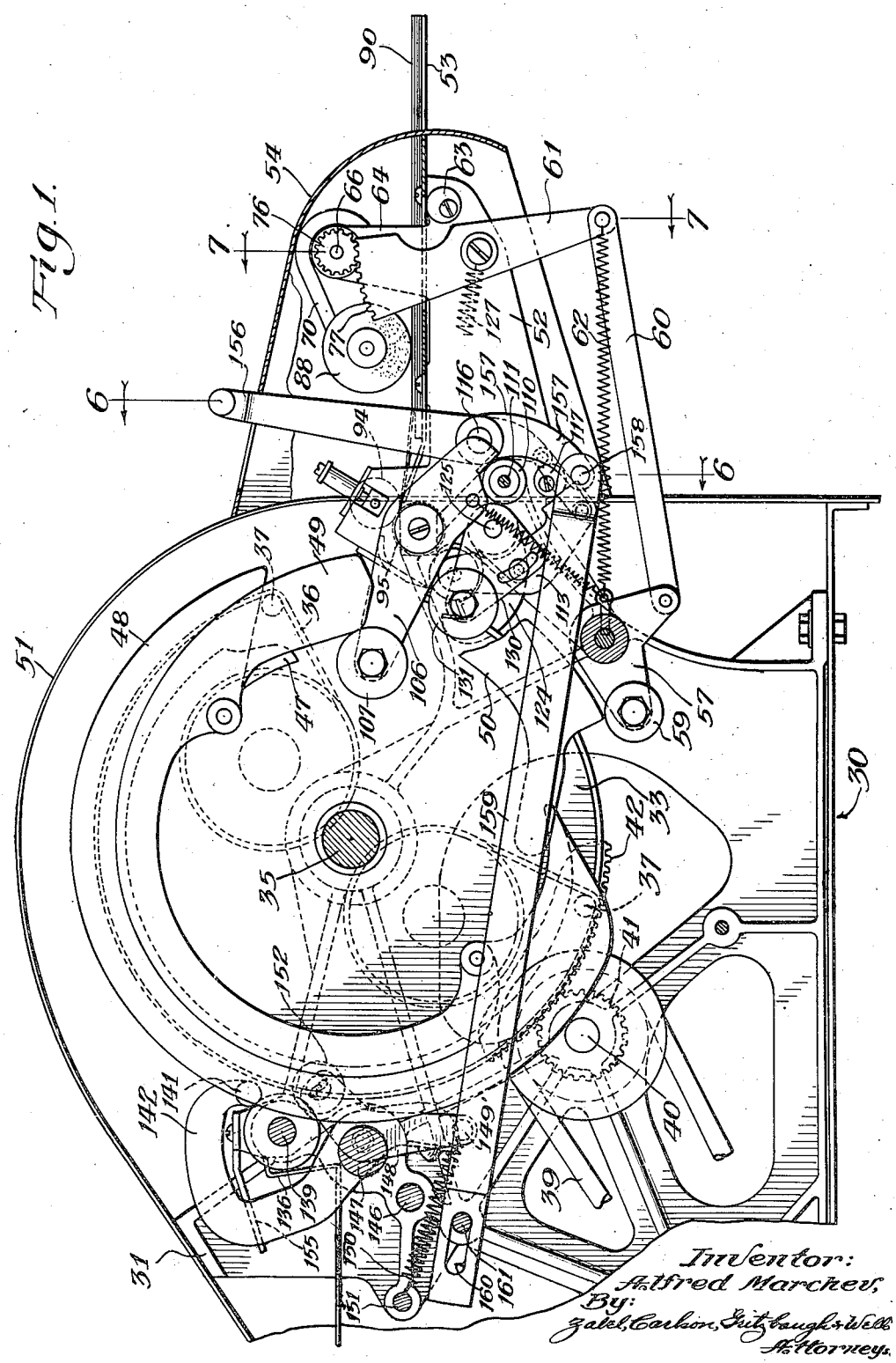
Fig. 1 is a side face view of the improved machine, but with the end portions broken away.

Figs. 6 and 7 are vertical sectional views taken substantially at the lines 6—6 and 7—7, respectively, of Fig. 1.

Figs. 8 and 9 are vertical sectional views on an enlarged scale taken substantially at the lines 8—8 and 9—9, respectively, of Fig. 7.

Figure 10:
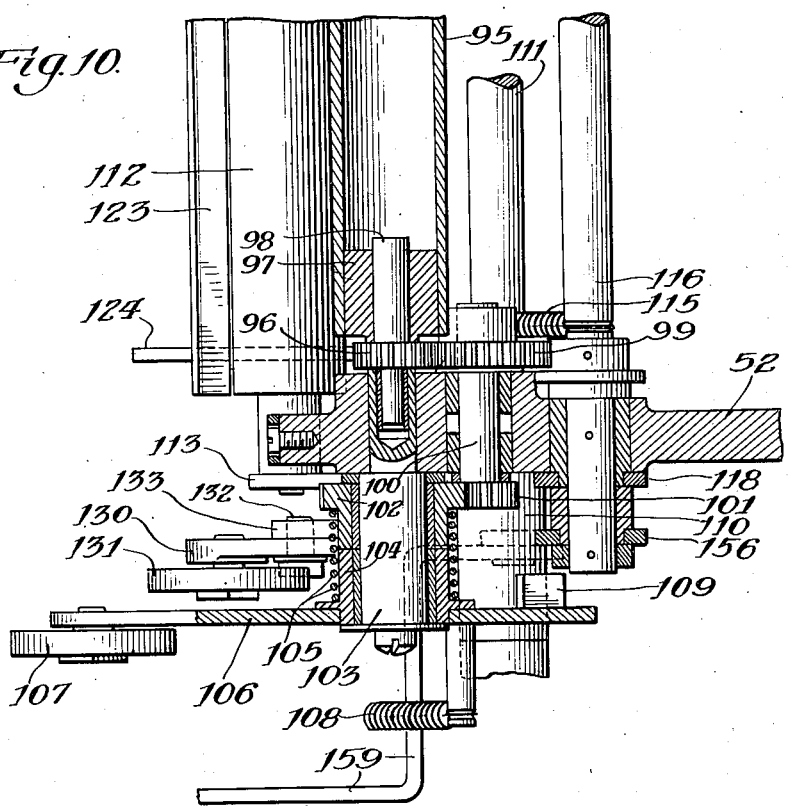
Figure 11:
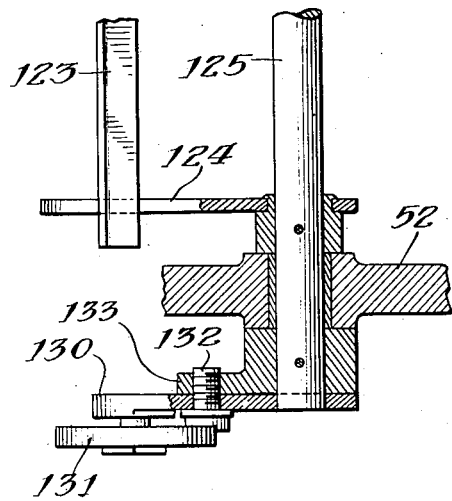
Figure 12:
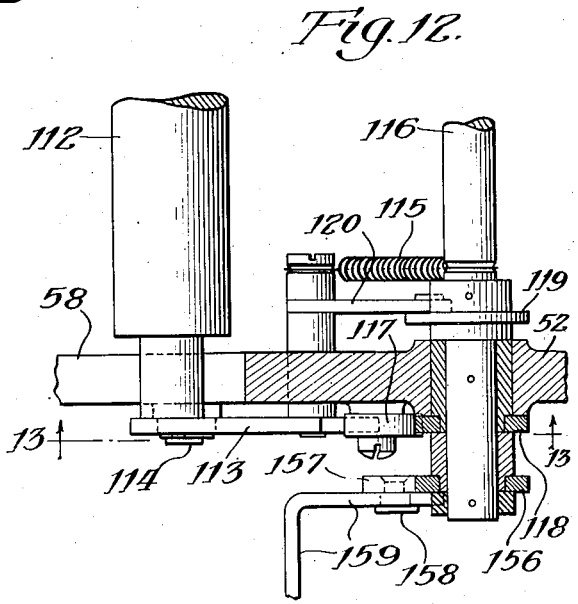

Figs. 10, 11 and 12 are horizontal sectional views taken substantially at the line 10—10, the line 11—11, and the line 12—12, respectively, of Fig. 3.

Fig. 13 is a vertical sectional view taken substantially at the line 13—13 of Fig. 12.

Fig. 14 is a view similar to Fig. 13 with certain of the parts omitted and showing a changed position of certain of the parts.

Fig. 15 is a vertical sectional view taken at the line 15—15 of Fig. 6.

Figs. 16 and 17 are views similar to Fig. 15 but showing changed positions of the parts.

Figs. 18 and 19 are views similar to parts of Fig. 1 but on an enlarged scale, Fig. 18 showing a stripper bar in position ready for an operative stroke and Fig. 19 showing said stripper bar withdrawn from operative position through the medium of an operating link.

Fig. 20 is a vertical sectional view taken at the line 20—20 of Fig. 2 showing the parts in the same operative position as in Fig. 18.

Fig. 21 is a view similar to Fig. 20 but showing the parts held by a cam in changed operative position.

Fig. 22 is a vertical sectional view taken at the line 22—22 of Fig. 20.

Fig. 23 is a horizontal sectional view taken at the line 23—23 of Fig. 20; and

Fig. 24 is a horizontal sectional view taken at the line 24—24 of Fig. 21.

Referring now to the several figures of the drawings, in which corresponding parts are indicated by the same reference characters, 30 indicates a frame which in the arrangement shown comprises standards 31 and 32 oppositely arranged (see Fig. 2) supporting a drum 33 by means of two short aligned shafts 34 and 35. The drum 33 is segmental in form as is usual in connection with gelatin-process duplicating machines, being provided with suitable mounting means of any approved type, as is indicated diagrammatically in Fig. 1, for mounting a gelatin band 36 about the face portion of the drum, the drum at the leading and rear edges of the face portion being provided with rollers 37 for engaging the gelatin band (see Figs. 1, 15 and 20). The arrangement is such that the gelatin band 36 can be shifted as desired circumferentially of the segmental face portion of the drum.

Means is provided for driving the drum 33, as is best shown in Fig. 2, comprising a drive pulley 38 connected by means of a belt 39 with any suitable source of power, said pulley 38 being rotatably mounted upon the standard 31 of the frame by means of a short stub shaft 40. The pulley 38 is provided at one side face with a pinion 41 rigidly connected therewith in position to mesh with a large gear 42 rotatably mounted upon the short shaft 34 by means of a collar 43. The gear 42 in turn is provided on its outer face portion with a ratchet wheel 44 which is adapted to be engaged by a pawl 45 pivotally mounted upon the adjacent face of a large gear 46 fixedly mounted upon the shaft 34 so as to rotate with the drum 33. No means is shown in the drawings for controlling the position of the pawl 45 by which power may be transmitted from the gear 42 to the gear 46. Control means of any approved type is to be employed as is well understood in the art for regulating the position of the pawl 45 in accordance with the requirements. Such control means are not shown since they form no part of the present invention.

Upon the opposite end of the drum from that at which the gear 46 is mounted thereon, I have provided four cams 47, 48, 49 and 50, rigidly mounted upon the drum so as to rotate therewith for purposes as hereinafter described. Over the operating parts at opposite ends of the drum 33, I have provided sheet metal housings 51 of any approved type, as is best shown in Figs. 1 and 2.

At the rear end of the machine (at the right in Fig. 1), I have provided extending frame bars 52 connected with the framework 30 for supporting a table 53 thereon, together with means for feeding the topmost sheet from a pile of copy sheets resting on the table. At opposite sides of the table, operating mechanism is provided in connection with the feed of the sheets from the table, and for covering such operating mechanism in part I have provided sheet metal housings 54 at opposite sides of the machine, as is best shown in Figs. 1 and 2. As is clearly shown in Fig. 6, the table 53 is preferably provided with adjustable side margin bars 55 at opposite sides of the table for holding the sheets in evenly piled relation to each other. In the arrangement shown, the margin bars 55 are held in frictional engagement with the table 53 by means of coiled springs 56, the arrangement being such that the margin bars are readily movable inwardly and outwardly with respect to each other to correspond with the width of the sheets being used.

The means for feeding to the drum the topmost sheet from a pile of sheets supported by the table 53 comprises means intermittently driven in timed relation to the rotation of the drum 33. This means comprises a bellcrank lever 57 pivotally mounted upon the end of an arm 58 extending forwardly and downwardly from one of the frame extension members 52 (see Fig. 3), such bellcrank lever having a roller 59 rotatably mounted upon one of its arms in position to be engaged by the cam 50 at a predetermined point in each rotation of the drum 33. The downwardly extending arm of the bellcrank lever 57 is connected by means of a link 60 with the lower end of an arm 61 which is pivotally mounted upon the frame member 52 at one side of the table 53. The arrangement is such that as the drum 33 rotates in clockwise direction from the position as shown in Fig. 3 the roller 59 and the bellcrank lever 57 are displaced in counterclockwise direction in said Fig. 3 for swinging the arm 61 also in counterclockwise direction in said figure. A coiled spring 62 connected between the movably mounted arm 61 and the lower end portion of the frame arm 58 serves to swing the movably mounted arm 61 in clockwise direction as soon as the cam 50 has cleared the roller 59 for permitting such result. An eccentric stop device 63 is adjustably mounted upon the frame member 52 in position to engage the edge of the arm 61 for limiting the movement of said arm in clockwise direction in said Fig. 3.

At opposite sides of the table 53 (see Fig. 7), I have provided frame arms 64 and 65 rising from the frame members 52 respectively for supporting a drive shaft in position across the table in upwardly spaced relation thereto. In the arrangement shown, the drive shaft is built up from a plurality of parts, comprising a short shaft section 66 which is journaled in the upper end of the frame arm 64, such shaft section being provided with a pin 67 therethrough at its inner end. Upon the inner end of the shaft section 66, a long sleeve 68 is mounted, notched at its outer end for operative engagement with the pin 67 so as to cause the section 66 and the sleeve 68 to rotate in unison. At its inner end, the sleeve 68 is slidably mounted upon a shaft section 69 which in turn is rotatably mounted in the side wall of a housing 70 as hereinafter described. The tubular member 68 is connected with the shaft section 69 by means of a pin 71 carried by the tubular member and working in a longitudinally extending slot 72 in the shaft section 69. A coiled spring 73 mounted in the sleeve 68 presses at one end against the end of the shaft section 69 and at its opposite end against a pin 74 extending across the sleeve. The arrangement is such that the shaft section 69 is caused to rotate with the shaft section 66 when the parts are in operative engagement as shown in said Fig. 7. The two shaft sections can however be very quickly and easily disconnected from each other by a movement of the sleeve 68 toward the right in said figure against the action of the spring 73 for disengaging the end portion of the sleeve at the left from the shaft section 66 and the pin 67.

The means for driving the shaft comprising the sections 66 and 69 includes a clutch member 75 loosely mounted upon the shaft section 66, such clutch member having fixedly mounted thereon a pinion 76 which meshes with gear teeth 77 on the upper end of the pivotally mounted arm 61, the arrangement being such that upon a stroke of the arm 61 in counterclockwise direction in Fig. 3 the clutch member 75 is driven in clockwise direction in Figs. 3 and 8. About the clutch member 75, there is a cylindrical housing 78 which is keyed upon the shaft section 66. The clutch member 75 is provided with three notches 79 in its outer face in which are loosely mounted spring-pressed rollers 80 as is usual in a roller clutch device. The arrangement is such that while the clutch member 75 is driven in clockwise direction in Fig. 8 the housing 78 is driven in the same direction through the medium of the rollers 80. Thus when the arm 61 is given an operative stroke in counterclockwise direction in Fig. 3 the clutch member 75 and the shaft 66 are rotated in clockwise direction in Fig. 8. When however the arm 61 is swung in clockwise direction in Fig. 3 so as to cause the clutch member 75 to rotate in counterclockwise direction in Fig. 8, the housing 78 and the connected shaft sections 66 and 69 are left stationary without any application of power thereto.

The means for supporting the housing 70 in position comprises a sleeve 81 rigidly connected with one side wall of the housing 70 in axial alignment with the shaft section 69. At the right in Fig. 7, the sleeve 81 is provided with a socket member 82 rigidly connected therewith adapted to have releasable sliding engagement with a lug 83 mounted rigidly in position in the upper end of the frame arm 65. The arrangement of the shaft comprising the sections 66 and 69 and the connections of said shaft as above described with the housing 70 and sleeve 81 are such as to hold the parts strongly in operative position during the operation of the machine. When the operator desires, however, the shaft and connected parts can be very quickly and easily removed from position. For accomplishing this purpose, the sleeve 68 is first moved toward the right in Fig. 7 for disengagement from the shaft section 66, and the whole assembly is then moved toward the left for freeing the socket member 82 from the lug 83.

Upon the inner end of the shaft section 69 within the housing 70, I have fixedly mounted a sprocket gear 84 which is connected by means of a sprocket gear 85 and a sprocket chain 86 with a short shaft 87 which extends through the side walls of the housing 70, having rollers 88 and 89 fixedly mounted upon its outer end portions. The arrangement is such that when the shaft section 69 is driven in clockwise direction in Fig. 9 by reason of an operative stroke of the arm 61 in counterclockwise direction in Fig. 3, the rollers 88 and 89 are likewise driven in clockwise direction in Fig. 9 for moving the topmost sheet of a pile of sheets 90 toward the left in Figs. 3 and 9. Upon the return movement of the arm 61 by the spring 62 the free-wheeling clutch device as above described permits the rotation of the gear 76 with respect to the shaft section 66 so as not to change the position of the rollers 88 and 89.

In the arrangement as above described, the housing 70 serves as an arm for spacing the rollers 88 and 89 from the shaft section 69, such arm extending across above the table in spaced relation to the table, the rollers 88 and 89 being held by their own weight in operative engagement with the pile of sheets 90. In case the operator should desire to move the rollers 88 and 89 out of engagement with the pile of sheets, this can be accomplished by merely swinging the housing 70 and its connected parts about the shaft section 69 and the sleeve 81 so as to carry the rollers 88 and 89 upwardly and backwardly past the axis of the shaft section 66. Stop devices are provided for holding the parts in such changed position, comprising a pin 91 in fixed position on the frame arm 65 and a lug 92 carried by the socket member 82 which in turn is rigidly connected with the sleeve 81 and the housing 70 as above described.

In Fig. 3 the roller 59 is shown in engagement with the cam 50 just ready for its operative stroke for forwarding the topmost sheet of the pile 90 toward the left in said figure. In Fig. 4, in which the parts are shown in the changed position which they assume upon a very slight advance movement of the drum from the position as shown in Fig. 3, the bellcrank lever 57 has been completely displaced for moving a sheet 93 from the pile 90 so as to bring its leading edge into the bite of two forwarding rollers 94 and 95 which are rotatably mounted upon the frame members 52 just in front of the table 53.

The rollers 94 and 95 are mounted in cooperative relation to each other for forwarding a sheet between them, the roller 95 being driven in the construction illustrated and the roller 94 being driven by frictional engagement with the roller 95 or with the interposed sheet. The means for rotating the feed roller 95 (see Fig. 10) comprises a pinion 96 fixedly connected with the roller by means of a head 97 and a pin 98, such pinion 96 being in operative engagement with a gear 99 fixedly mounted upon a short shaft 100 which in turn is rotatably mounted in the framework. At its outer end, the shaft 100 is provided with a pinion 101 which meshes with a gear 102 rotatably mounted upon a stub shaft 103 carried by the framework. Upon the stub shaft 103 adjacent to the gear 102 there is mounted a sleeve 104 of substantially the same size as that of the hub of the gear 102, said sleeve 104 and the aligned hub having a coiled spring 105 mounted thereon in such relation as to be tightened upon the sleeve and the hub when the sleeve 104 is driven in counterclockwise direction in Fig. 13 so as to cause the gear 102 to rotate in that direction with the sleeve. The arrangement is such that when the sleeve 104 is rotated in clockwise direction in said Fig. 13 the spring is loosened so as not to apply power to the hub of the gear 102. As a result of this construction, when the sleeve 104 is rotated in counterclockwise direction in Fig. 4 the roller 95 is driven in the same direction so as to cooperate with the roller 94 for forwarding the sheet 93 toward the left.

For actuating the sleeve 104, an arm 106 is mounted thereon having a roller 107 rotatably mounted upon one end portion, such roller standing normally in the path of the cam 49. A spring 108 connected at one end with the arm 106 and at its opposite end with the frame arm 58 holds the arm 106 normally in the position as shown in Fig. 4, with a lug 109 on said arm standing in engagement with a bumper 110 preferably formed of rubber and supported by a tie-rod 111. As the drum 33 carries the cam 49 in clockwise direction from the position as shown in Fig. 4 to the position as shown in Fig. 5, the rollers 94 and 95 are given operative rotary movement for advancing the sheet 93 toward the left.

A short distance below the rollers 94 and 95 in advance of said rollers, I have provided a platen roller 112 which is rotatably mounted between two arms 113 which are pivotally mounted upon the framework by means of pivot pins 114, as is best shown in Figs. 13 and 14. Springs 115 connected at their lower ends with the lower ends of the arms 113 and at their upper ends with a rock shaft 116 hold the arms 113 normally turned to the limit of their motion in counterclockwise direction in Fig. 13 so as to hold the platen roller 112 in impression relationship to the drum 33 and the gelatin band 36 mounted thereon. For limiting the movement of the roller 112 toward the drum, I have provided eccentric devices 117 adjustably mounted in position upon the framework so as to be engaged by the lower end portions of the arms 113, as is clearly shown in said Fig. 13.

For moving the platen roller 112 toward the right from the position shown in Fig. 13 to the position as shown in Fig. 14 out of impression relationship with the drum, I have provided a lever 118 fixedly mounted upon the shaft 116. Depending from said rock shaft 116, there are two arms 119 which are flexibly connected by means of links 120 with the lower end portions of the arms 113, the arrangement being such that when the lever is swung from its solid line position as shown in Fig. 13 to its solid line position as shown in Fig. 14 the arms 113 are swung in clockwise direction about the pins 114 so as to carry the platen roller 112 out of impression relationship to the drum. This movement of the lever 118 carries the springs 115 into slightly past centers position with respect to the pivotal connection between the links 120 and the arms 119. The result is that the springs 115 are effective for holding the platen roller 112 against the drum in the position of the parts as shown in Fig. 13 and are effective alternatively for holding the platen roller in spaced relation to the drum as shown in Fig. 14.

In the description above, the springs 115 are described as holding the platen roller 112 in engagement with the drum. Such statement is correct with respect to the conditions when the segmental drum is in position to be engaged. When the drum has been rotated out of position to have its face portion engaged by the platen roller (see Fig. 15), the springs 115 then hold said roller in position for engagement with the drum when the drum in its rotation again reaches the position as shown in Fig. 16.

From a study of the parts as shown in Fig. 17, it will be appreciated that the line connecting the axis of the drum 33 with the axis of the roller 112 stands at approximately a right angle to the line connecting the axes of the rollers 94 and 95. As a result of this arrangement, the rollers 94 and 95 normally direct the sheet 93 approximately toward the center of the drum 33 rather than toward the point of contact between the drum and the platen roller. For diverting the sheet 93 as it is forwarded by the rollers 94 and 95 from the normal path toward the axis of the drum so as to cause the sheet to pass into the bite of the drum and the platen roller 112, I have provided a curved guide 121, as is clearly shown in Fig. 16, directly in the path of the advancing sheet arranged so that the sheet by following the contour of the guide is given the form of a loop, as is shown at 122 in said Fig. 16. The sheet advancing from the guide 121 passes into contact with the platen roller 112 and thence into engagement with a margin stop device 123 which is movably mounted in position a short distance in advance of the platen roller 112. The stop device 123 is in the form of a trough, being mounted in position adjacent to the platen roller 112 by means of arms 124 which are fixedly mounted upon a rock shaft 125 extending across the machine. The rock shaft 125 is provided with an arm 126 (see Figs. 15 and 16) which is connected by a spring 127 with the framework underneath the table 53, as is best shown in Fig. 1, such spring serving normally to hold the stop device in raised position adjacent to the platen roller 112 as shown in Figs. 15 and 16. For limiting the upward movement of the stop device 123, I have provided a bumper 128, preferably in the form of a block of rubber, carried by the arm 126 in position to engage an eccentric 129 adjustably mounted in position upon one of the frame members 52, as is best shown in Figs. 15 and 17.

For moving the stop device 123 out of its raised position as shown in Fig. 15 to its lowered position as shown in Fig. 17, in timed relation to the movement of the drum, I have provided an arm 130 adjustably mounted in position upon the rock shaft 125 (see Fig. 11), such arm being provided upon its free end with a roller 131 in position to engage the cam 48 as the drum rotates. As is best shown in Figs. 4 and 11, the arm 130 is adjustable with respect to the shaft 125 by means of a screw 132 caried by a short arm 133 fixedly mounted upon the shaft 125, the screw 132 being positioned within a circular slot 134 formed in the arm 130. Upon loosening the screw 132, the arm 130 can be moved to the desired angular position with respect to the arm 133, the screw 132 when tightened being adapted to hold the arms in adjusted position. By an adjustment of the arm 130 with respect to the short arm 133, the position of the roller 131 with respect to the margin bar 123 is varied. The adjustment is preferably to be such that the margin bar shall be held in operative position as shown in Fig. 16 until the roller 37 and the gelatin band 36 are brought into close proximity to the margin bar. The roller 131 and cam 48 are then to operate in accurately timed relation for displacing the margin bar 123 ahead of the roller 37 so as to prevent the gelatin band from being brought into engagement with the margin bar.

When the drum 33 reaches the position as shown in Fig. 16, with a copy sheet 93 in position as shown in said figure, the gelatin band 36 is brought into operative engagement with the copy sheet so as to cause the sheet to adhere to the band. Upon the continued rotation of the drum, the copy sheet 93 bonded to the gelatin band is caused to advance with the band. At the initial contact of the band 36 with the copy sheet as shown in Fig. 16, the zone of engagement between the two is quite limited and the effectiveness of the hold on the sheet is correspondingly small. As the drum advances, however, from the position as shown in Fig. 16, the loop in the sheet 93 at 122 is eliminated so as to straighten out the sheet into the condition as shown in Fig. 17. By the time when the looped portion has been straightened, the zone of engagement of the sheet 93 and the gelatin band 36 has been very considerably increased with a corresponding increase in the strength of the hold on the sheet so as to enable the band to draw the sheet forward without danger of tearing the sheet or of destroying the bond between the sheet and the band.

As has been described above, the rollers 88 and 89 are adapted to give the sheet 93 its initial forward movement, serving to carry the sheet into the bite of the rollers 94 and 95. The sheet remains then in this position until the rollers 94 and 95 are actuated for drawing the sheet forward independently of the rollers 88 and 89, such rollers 88 and 89 being adapted to rotate independently of their normal drive so as not to interfere with the forward movement of the sheet which is carried by the rollers 94 and 95 into engagement with the platen roller 112 and the stop device 123. The sheet 93 is again brought to rest momentarily in the position of the sheet as shown in Fig. 16 until a bond is established between the copy sheet and the gelatin band 36 as above described, whereupon the sheet is drawn forward by the drum, with both the rollers 94 and 95 and the rollers 88 and 89 being driven by the sheet instead of serving to drive the sheet.

The means for stripping the copy sheets from engagement with the gelatin band comprises a roller 135 mounted between the frame members 31 and 32 in slightly spaced relation to the drum as is clearly shown in Fig. 18. The roller 135 is preferably cut away at portions of its face so as to provide a plurality of spaced sections (see Fig. 22) for enabling guide fingers 136 forming part of a receiving tray 137 to have the desired effective cooperation with the roller. In the arrangement shown, the roller 135 is mounted in position by means of a shaft 138 which is adjustably mounted in position within eccentric bearing blocks 139 carried by the frame members 31 and 32. By an adjustment of the eccentric members 139, the spacing between the roller and the drum can be regulated, as will be readily understood. The roller 135 is continuously driven during the operation of the machine by means of a pinion 140 fixedly mounted upon the shaft 138 in position to mesh with the large gear 46, as is clearly shown in Fig. 2.

For cooperation with the stripper roll 135, I have provided a stripper bar 141 extending longitudinally of the drum adjacent to the roller 135, as is best shown in Figs. 2 and 21. The bar 141 is preferably in the form of a roller rotatably mounted between arms 142 which are fixedly mounted upon a rock shaft 143 (see Fig. 23). Said arms 142 are mounted in position upon the rock shaft 143 by means of blocks 144 which extend downwardly in the form of arms below the rock shaft, being provided with bumper members 145, preferably of rubber, on their front faces in position to engage a tie-rod 146 for limiting the movement of the stripper bar 141 toward the drum. As is clearly shown in Fig. 23, the rock shaft 143 is rotatably mounted in position by means of eccentric bearing blocks 147 which are adjustably mounted in the frame members 31 and 32.

As is also clearly shown in said Fig. 23, a bellcrank lever 148 is fixedly mounted upon the rock shaft 143, being mounted in position upon the rock shaft through the medium of a block 149. The downwardly extending arm of the bellcrank lever 148 is provided with a pin 149' extending from its face, such pin having a spring 150 connected therewith for holding the bellcrank lever normally turned to the limit of its motion in clockwise direction in Fig. 20, the spring 150 being connected at its opposite end with the frame member 32 by means of a pin 151, as is best shown in Fig. 2. The other arm of the bellcrank lever 148 extends toward the drum, being provided at its end portion with a cam roller 152 in position to engage the cam 47 at timed intervals in the rotation of the drum. As is best shown in Figs. 20 and 21, the cam roller 152 is adjustable with respect to the bellcrank lever 148, being secured in position by means of a pin 153 which is slidably mounted in a slot 154 in the arm of the lever. The arrangement is such that the spring 150 normally holds the roller 152 in position for engagement with the cam 47, as shown in Figs. 18 and 20, the stripper bar roller 141 standing under such circumstances in such position as to enable the extending end portion of the copy sheet 93 to move to a point opposite the outer face of said stripper bar as indicated in said two figures.

In the normal operation of the machine, the stripper bar 141 is held in the position as shown in Fig. 20 until the copy sheet 93 stands opposite the face of said bar 141, when the cam 47 engages the roller 152 for rotating the shaft 143 in counterclockwise direction in said Fig. 20 against the action of the spring 150 for carrying the stripper bar 141 outwardly toward the left in said figure. Such movement of the stripper bar 141 forces the loose end portion of the copy sheet 93 into engagement with the rotating stripper roller 135 by reason of which the copy sheet is caused to move toward the left into the position as shown in Fig. 21. As the drum continues to rotate, the copy sheet is continued in its movement toward the left until it is completely stripped from the gelatin band 36 and delivered to the tray 137. For turning the end of the copy sheet 93 downwardly into the tray, I have provided a guide plate 155 which is secured between the frame standards 31 and 32 at their upper end portions as is clearly shown in Fig. 2. The arrangement is such that upon each succeeding rotation of the drum the leading edge of the copy sheet normally is stripped from the gelatin band in the manner described.

In my improved machine, I have provided means for throwing the stripper mechanism out of operation. This means comprises a lever 156 (see Fig. 2) mounted adjacent to the lever 118, such lever 156 in the arrangement shown being loosely mounted upon the rock shaft 116, as is best shown in Fig. 12. As is clearly shown in Fig. 3, the lever 156 is provided with a downward extension 157 below the rock shaft 116, such extension 157 being pivotally connected by means of a rivet 158 with the rear end portion of a link 159 which extends forwardly along the side of the machine as is best shown in Fig. 1. At its forward end, the link 159 is provided with a longitudinally extending slot 160 therein which is slidably mounted upon a pin 161 carried by the adjacent frame member 32 (see Figs. 20 and 21). As is clearly shown in Fig. 24, the link 159 is formed in two sections in order to provide a laterally extending arm 162 at an intermediate point along the link, such laterally extending arm 162 being provided at its end portion with a set-screw 163 adjustably mounted in position therein for operative engagement with the pin 149' carried by the bellcrank lever 148 as above described. The arrangement is such that when the lever 156 is moved in counterclockwise direction in Fig. 3, the link 159 is moved rearwardly for bringing the set-screw 163 into operative engagement with the pin 149' so as to swing the bellcrank lever 148 in counterclockwise direction in Fig. 18 for carrying the cam roller 152 out of engagement with the cam 47 and for carrying the stripper roller bar 141 from the position as shown in Fig. 18 to the position as shown in Fig. 19. With the stripper bar 141 held in the position as shown in said Fig. 19, the drum 33 is enabled to carry a copy sheet 93 a plurality of times past the critical point at which the stripping operation normally takes place. As soon as the pressure upon the lever 156 is relaxed, the spring 150 serves to carry the cam roller 152 and the stripper bar 141 again into position for normal operation.

It is believed to be unnecessary to describe further in detail the operation of the machine or any of the parts. When the stripper mechanism is held out of operation by pressure upon the lever 156 as above described, feed rollers 88 and 89 are preferably swung manually upwardly and backwardly as above describeed out of engagement with the pile of sheets so as to prevent the delivery of additional sheets to the drum while a sheet is being carried around for a repeated impression. The arrangement is such that all of the remaining operations can be carried out without bad effects during the time the stripper mechanism is thrown out of operation, such parts being adapted to run idly in the absence of additional copy sheets being fed to the drum.

By the use of my improved apparatus, I have been enabled to obtain very satisfactory results in the matter of the handling of the paper for rapid and accurate work.

While I prefer to employ the form and arrangement of parts as illustrated in the drawings and as above described, it is to be understood that my invention is not limited to the form and arrangement as shown except so far as the claims may be so limited, it being understood that changes might well be made in the form and arrangement of the parts without departing from the spirit of my invention.

I claim:

1. In a duplicating machine, the combination of a drum, means for rotating said drum, two rollers rotatably mounted adjacent to said drum in cooperative relation to each other for forwarding a copy sheet to said drum, a platen roller rotatably mounted in position to press a copy sheet into operative engagement with the drum, and means for applying power to said rollers during a portion only of each successive rotation of the drum, comprising an arm pivotally mounted on the axis of one of said rollers, clutch means connecting said arm with said roller and actuated by an operative movement of said arm for driving said rollers in the direction for forwarding a sheet to the drum, and means rotating with the drum for giving said arm an operative stroke for advancing the leading edge of a copy sheet from a position between said rollers to a position between the drum and the platen.

2. In a duplicating machine, the combination of two rotary members adapted to rotate in operative engagement with each other, means for rotating said rotary members, two rollers rotatably mounted adjacent to said rotary members and also in cooperative relation to each other for forwarding a copy sheet to said first-named rotary members, and means for applying power to said rollers intermittently during the rotation of said first-named rotary members, comprising an arm movably mounted adjacent to said first-named rotary members, means actuated by an operative movement of said arm for driving said rollers in the direction for forwarding a sheet to said first-named rotary members, and means adapted at timed intervals during the rotation of said first-named rotary members to give said arm an operative stroke for advancing the leading edge of a copy sheet from a position between said rollers to a position between said first-named rotary members.

3. In a duplicating machine, the combination of two rotary members adapted to rotate in operative engagement with each other, means for rotating said rotary members, two rollers rotatably mounted adjacent to said rotary members and also in cooperative relation to each other for forwarding a copy sheet to said first-named rotary members, and means for applying power to said rollers intermittently during the rotation of said first-named rotary members, comprising an arm movably mounted adjacent to said first-named rotary members, speed-up gearing operatively connecting said arm with one of said rollers for driving said rollers in the direction for forwarding a sheet to said first-named rotary members, and means adapted at timed intervals during the rotation of said first-named rotary members to give said arm an operative stroke for advancing the leading edge of a copy sheet from a position between said rollers to a position between said first-named rotary members.

4. In a duplicating machine, the combination of a drum, means for rotating said drum, two rollers rotatably mounted adjacent to said drum in cooperative relation to each other for forwarding a copy sheet to said drum, and means for applying power to said rollers during a portion only of each successive rotation of the drum, comprising an arm movably mounted adjacent to the drum, free-wheeling means comprising a coiled spring connecting said rollers with said arm adapted by a tightening of the spring upon an operative movement of the arm to drive said rollers in the direction for forwarding a sheet to the drum but adapted to permit the arm to swing in the opposite direction so as to loosen said spring without rotating said two rollers, and cam means rotating with the drum for giving said arm an operative stroke in timed relation to the movement of the drum.

5. In a duplicating machine, the combination of two rotary members adapted to rotate in operative engagement with each other, means for rotating said rotary members, two rollers rotatably mounted adjacent to said rotary members and also in cooperative relation to each other for forwarding a copy sheet to said first-named rotary members, and means for applying power to said rollers intermittently during the rotation of said first-named rotary members, comprising an arm movably mounted adjacent to said first-named rotary members, a free-wheeling cluch connection between said rollers and said arm actuated by said arm for driving said two rollers in the direction for forwarding a sheet to the drum but adapted to permit free swinging movement of the arm in the opposite direction independently of the rollers, means rotating with the drum for giving said arm an operative stroke in timed relation to the movement of the drum, and yielding means for giving said arm a reverse movement after said rollers have completed the forward movement of a sheet.

6. In a duplicating machine, the combination of two rotary members adapted to rotate in operative engagement with each other, means for rotating said rotary members, two rollers rotatably mounted adjacent to said rotary members and also in cooperative relation to each other for forwarding a copy sheet to said first-named rotary members, and means for applying power to said rollers intermittently during the rotation of said first-named rotary members, comprising an arm movably mounted adjacent to said first-named rotary members, means actuated by an operative movement of said arm for driving said rollers in the direction for forwarding a sheet to said first-named rotary members and arranged so as to permit said rollers to continue to rotate in the same direction independently of said arm, and means adapted at timed intervals during the rotation of said first-named rotary members to give said arm an operative stroke for advancing the leading edge of a copy sheet from a position between said two rollers to a position between said first-named rotary members.

7. In a duplicating machine, the combination of a drum, means for rotating said drum, a table adjacent to said drum, a shaft rotatably mounted on a fixed axis in horizontal position above said table, an arm swingingly mounted on said shaft at about the middle point transversely of the table and extending therefrom above said table in spaced relation thereto, a roller rotatably mounted on said arm so as to engage successive top sheets of a pile of sheets on said table, means for driving said roller from said shaft arranged to permit the arm to move freely upwardly and downwardly without interfering with the drive of the roller, and means for driving said shaft in one direction for causing the roller to move a sheet edgewise from the pile but adapted upon actuation in the opposite direction to permit the shaft and the roller to remain stationary.

8. In a duplicating machine, the combination of a drum, a table adjacent to said drum, a shaft removably mounted on a fixed axis in horizontal position above said table, an arm swingingly mounted on said shaft and extending forwardly therefrom above said table in spaced relation thereto, a roller rotatably mounted on said arm so as to engage successive top sheets of a pile of sheets on said table, means for driving said roller from said shaft arranged to permit the arm to move vertically without interfering with the drive of the roller, a pinion, means actuated at a predetermined point in each rotation of the drum to rotate said pinion, and free-wheeling clutch mechanism connecting said pinion with said shaft for giving said roller a rotary movement for forwarding a sheet from the top of said pile.

9. In a duplicating machine, the combination of a drum, a table adjacent to said drum, a shaft removably mounted in horizontal position above said table, an arm swingingly mounted on said shaft and extending forwardly therefrom above said table in spaced relation thereto, a roller rotatably mounted on said arm so as to engage successive top sheets of a pile of sheets on said table, means for driving said roller from said shaft arranged to permit the arm to move vertically without interfering with the drive of the roller, a pinion, means actuated at a predetermined point in each rotation of the drum to rotate said pinion, free-wheeling clutch mechanism connecting said pinion with said shaft for giving said roller a rotary movement for forwarding a sheet from the top of said pile, and stop means for holding a roller releasably in fixed spaced relation to said table when said first-named arm is swung upwardly and backwardly over the axis of said shaft to the limit of its motion for carrying said roller away from the table.

10. In a duplicating machine, the combination of a segmental drum, means for mounting a gelatin member on said drum, means for applying a copy sheet to said gelatin member with an end portion of the sheet extending beyond said member, a stripping roller rotatably mounted in slightly spaced relation to said drum at one side thereof, a second roller rotatably mounted in position substantially opposite the inner face of said stripping roller and movable bodily toward said stripping roller, means for moving said second roller normally outwardly in such timed relation to the rotation of the drum as to carry the loose extending end portion of said copy sheet into firm engagement with said stripping roller for removing the copy sheet from engagement with said gelatin member, and manually operable means for moving said second roller outwardly out of the influence of said first-named moving means so as to permit said copy sheet to make repeated rotations with said drum.

11. In a duplicating machine, the combination of a segmental drum, a platen roller mounted for cooperation therewith, driving means for said drum, two rollers cooperating with each other for feeding a copy sheet to a position wherein said copy sheet will be engaged by said drum and said platen, a support for a pile of copy sheets, a roller positioned above said support for engaging the top sheet of said pile to displace said top sheet edgewise into the bite of said two feed rollers, means to drive said top sheet engaging roller and said two feed rollers intermittently in timed relationship to rotation of said drum, means for permitting said top sheet engaging roller to be rotated freely by the pull of said copy sheet when said copy sheet has been engaged by said two feed rollers and means for permitting said two feed rollers to be rotated freely by the pull of said sheet when said copy sheet has been engaged by said drum and said platen roller.

12. In a mechanism of the type described, the combination of a frame, means for supporting a pile of sheets on said frame, a feed roller rotatably mounted on said frame so as to engage the top sheet of said pile for feeding the sheet forwardly, a pair of forwarding rollers rotatably mounted on said frame adjacent to said feed roller for advancing a sheet from said feed roller, a third sheet actuating means adapted by a gripping engagement with a sheet to pull the sheet forwardly edgewise from said forwarding rollers, means adapted to drive said feed roller intermittently in one direction for forwarding the top sheet into the bite of said forwarding rollers and adapted to yield for permitting the feed roller to rotate freely in the same direction when the sheet is moved forwardly independently, and means adapted to drive said forwarding rollers intermittently in the direction for continuing the forward movement of said sheet into the grip of said third sheet actuating means and adapted to yield for permitting the forwarding rollers to rotate freely in the same direction when the sheet is pulled forwardly by said third sheet actuating means.

13. In a mechanism of the type described, the combination of a frame, a drum rotatably mounted on said frame, means for supporting a pile of sheets adjacent to said drum, means for rotating said drum, a platen roller rotatably mounted in impression relationship to said drum, a feed roller rotatably mounted on said frame so as to engage the top sheet of said pile for feeding the sheet forwardly toward the drum, a pair of forwarding rollers rotatably mounted on said frame adjacent to said feed roller for advancing a sheet from said feed roller into the bite of said drum and its cooperating platen roller, means adapted at a predetermined point in the rotation of said drum to give said feed roller an intermittent rotary movement in the direction for forwarding the top sheet into the bite of said forwarding rollers and adapted to yield for permitting the feed roller to rotate freely in the same direction when the sheet is moved forwardly independently, and means adapted shortly after the close of the drive of said feed roller by said intermittently acting driving means to give said forwarding rollers an intermittent rotary movement in the direction for continuing the forward movement of said sheet into the bite of said drum and platen roller and adapted to yield for permitting the forwarding rollers to rotate freely in the same direction when the sheet is pulled forwardly by said drum and platen roller.

14. In a mechanism of the type described, the combination of a frame, means for supporting a pile of sheets on said frame, a feed roller rotatably mounted on said frame so as to engage the top sheet of said pile for feeding the sheet forwardly, a pair of forwarding rollers rotatably mounted on said frame adjacent to said feed roller for advancing a sheet from said feed roller, a third sheet actuating means adapted by a gripping engagement with a sheet to pull the sheet forwardly edgewise from said forwarding rollers, and means comprising a clutch adapted to drive in one direction and to run freely in the opposite direction for giving said feed roller intermittent rotary movement for forwarding the top sheet into the bite of said forwarding rollers, and comprising a second clutch adapted to drive in one direction and to run freely in the opposite direction for giving said forwarding rollers intermittent rotary movement for continuing the forward movement of said sheet into the grip of said third sheet actuating means.

15. In a mechanism of the type described, the combination of a frame, a drum rotatably mounted on said frame, means for rotating said drum, means for pressing a sheet into impression relationship with the drum as the drum rotates so as to cause the sheet to move around with the drum, and forwarding means comprising a roller intermittently actuated when the drum reaches a predetermined point in its rotation for forwarding a sheet into the grip of said drum and its cooperating impression means and adapted to run free after the period of intermittent drive for permitting the sheet to be pulled forwardly independently by the drum.

16. In a mechanism of the type described, the combination of a frame, a drum rotatably mounted on said frame, means for rotating said drum, a platen roller rotatably mounted in impression relationship to said drum, forwarding rollers rotatably mounted in cooperative relation to each other adjacent to said platen roller, and means for giving said forwarding rollers intermittent rotary motion at a predetermined point in the rotation of the drum for forwarding a sheet into the bite of the drum and its cooperating platen roller and adapted to run free after the period of intermittent drive for permitting the sheet to be pulled forwardly independently by the drum.

ALFRED MARCHEV.